United States Patent [19]

Schirmer et al.

[11] Patent Number: 5,389,448
[45] Date of Patent: Feb. 14, 1995

[54] BLENDS OF POLYPROPYLENE AND ETHYLENE COPOLYMER AND FILMS MADE FROM THE BLEND

[75] Inventors: Henry G. Schirmer; Allen C. Williams, Jr., both of Spartanburg; Martin Nelson, Greer, all of S.C.

[73] Assignee: W.R. Grace & Co.-Conn., Duncan, S.C.

[21] Appl. No.: 42,429

[22] Filed: Apr. 2, 1993

Related U.S. Application Data

[60] Division of Ser. No. 810,003, Dec. 18, 1991, which is a continuation of Ser. No. 659,215, Feb. 22, 1991, abandoned, which is a continuation-in-part of Ser. No. 566,594, Aug. 13, 1990, abandoned.

[51] Int. Cl.$^6$ .................... B32B 27/28; B32B 27/32
[52] U.S. Cl. .................... 428/517; 428/336; 428/516; 525/240
[58] Field of Search .................... 428/516, 517

[56] References Cited

U.S. PATENT DOCUMENTS

| | | | |
|---|---|---|---|
| 3,248,359 | 4/1966 | Maloney | 525/222 |
| 3,433,573 | 3/1969 | Holladay et al. | 525/222 |
| 3,456,044 | 7/1989 | Pahlke | 264/25 |
| 3,551,540 | 12/1970 | Pellicciari et al. | 264/89 |
| 3,555,604 | 11/1971 | Pahlke | 18/14 |
| 3,894,907 | 7/1975 | Sudo | 156/494 |
| 3,932,563 | 1/1976 | Argurio et al. | 260/897 |
| 4,045,515 | 8/1977 | Isaka et al. | 525/222 |
| 4,048,378 | 9/1977 | Pelzek | 428/483 |
| 4,066,811 | 1/1978 | Hino et al. | 428/220 |
| 4,073,782 | 2/1978 | Kishi et al. | 260/23 |
| 4,258,166 | 3/1981 | Canterino et al. | 526/348 |
| 4,277,578 | 7/1981 | Yoshimura et al. | 525/222 |
| 4,292,355 | 9/1981 | Bonis | 428/35 |
| 4,333,968 | 6/1982 | Nahmias | 427/173 |
| 4,340,641 | 7/1982 | Weiner | 428/349 |

(List continued on next page.)

FOREIGN PATENT DOCUMENTS

| | | |
|---|---|---|
| 0060526 | 9/1982 | European Pat. Off. . |
| 0092318 | 10/1983 | European Pat. Off. . |
| 0144642 | 6/1985 | European Pat. Off. . |
| 0165791 | 12/1985 | European Pat. Off. . |
| 0214945 | 3/1987 | European Pat. Off. . |
| 0221726 | 5/1987 | European Pat. Off. . |
| 0235930 | 9/1987 | European Pat. Off. . |
| 0282282 | 9/1988 | European Pat. Off. . |
| 0298700 | 1/1989 | European Pat. Off. . |
| 0319401 | 6/1989 | European Pat. Off. . |
| 0321957 | 6/1989 | European Pat. Off. . |
| 0333508 | 9/1989 | European Pat. Off. . |
| 2529563 | 1/1984 | France . |
| 52-072744 | 6/1977 | Japan . |
| 55-157637 | 12/1980 | Japan . |
| 58-157839 | 9/1983 | Japan ................ 525/240 |
| 0157839 | 9/1983 | Japan . |
| 0243842 | 10/1986 | Japan . |
| 61-243842 | 10/1986 | Japan ................ 525/240 |
| 63-033449 | 2/1988 | Japan . |
| 0041550 | 2/1988 | Japan . |
| 0054736 | 10/1988 | Japan . |
| 0120339 | 5/1989 | Japan . |
| 2123747 | 2/1984 | United Kingdom . |
| 2216845 | 10/1989 | United Kingdom . |

OTHER PUBLICATIONS

Holden et al "Block & Craft Copolymerization" Chap 6 pp. 133 & 165.
Film Extrusion Materials Union Carbide (1984).
VLDPE-A New Class of PE Plastics & Rubber In pp. 34–36 Apr. 1986 vol. 11 No. 2.

Primary Examiner—Carman J. Seccuro, Jr.
Attorney, Agent, or Firm—Mark B. Quatt

[57] ABSTRACT

A composition of matter comprises a blend of propylene homopolymer or copolymer, and ethylene copolymer. Ethylene vinyl acetate copolymer (EVA), very low density polyethylene (VLDPE), and ethylene alpha olefin copolymer are preferred ethylene copolymers. VLDPE with a high molecular weight (low melt index), and with a broad molecular weight distribution (high flow rate ratio) is preferred. A multilayer film comprises a first layer comprising a propylene homopolymer or copolymer, or blend, and at least one outer sealable layer.

16 Claims, 2 Drawing Sheets

U.S. PATENT DOCUMENTS

| | | | |
|---|---|---|---|
| 4,354,997 | 10/1982 | Mizutani et al. | 264/560 |
| 4,355,076 | 10/1982 | Gash | 428/411 |
| 4,367,256 | 1/1983 | Biel | 428/218 |
| 4,389,450 | 6/1983 | Schaefer et al. | 428/212 |
| 4,390,587 | 6/1983 | Yoshimura et al. | 428/215 |
| 4,399,181 | 8/1983 | Yoshimura et al. | 428/213 |
| 4,421,823 | 12/1983 | Theisen et al. | 428/349 |
| 4,425,268 | 1/1984 | Cooper | 524/110 |
| 4,440,824 | 4/1984 | Bonis | 428/216 |
| 4,464,439 | 8/1984 | Castelein | 428/517 |
| 4,484,971 | 11/1984 | Wang | 156/244 |
| 4,501,634 | 2/1985 | Yoshimura et al. | 156/244 |
| 4,524,099 | 6/1985 | De Luccio | 428/213 |
| 4,563,504 | 1/1986 | Hert et al. | 525/240 |
| 4,588,650 | 5/1986 | Mientus et al. | 428/516 |
| 4,608,286 | 8/1986 | Motoishi et al. | 428/35 |
| 4,619,859 | 10/1986 | Yoshimura et al. | 428/213 |
| 4,626,455 | 12/1986 | Karabedian | 428/35 |
| 4,652,490 | 3/1987 | Arita et al. | 428/347 |
| 4,657,982 | 4/1987 | Breck et al. | 525/240 |
| 4,671,987 | 6/1987 | Knott, II et al. | 428/216 |
| 4,705,829 | 11/1987 | Kwack et al. | 525/240 |
| 4,713,282 | 12/1987 | Yazaki | 428/216 |
| 4,720,427 | 1/1988 | Clauson et al. | 428/349 |
| 4,732,940 | 3/1988 | Yamaoka et al. | 525/240 |
| 4,748,206 | 5/1988 | Nogiwa et al. | 525/240 |
| 4,764,404 | 8/1988 | Genske et al. | 428/516 |
| 4,769,283 | 9/1988 | Sipinen et al. | 525/240 |
| 4,778,697 | 10/1988 | Genske et al. | 428/516 |
| 4,778,699 | 10/1988 | Knox et al. | 428/35 |
| 4,812,526 | 3/1989 | Ribi | 525/240 |
| 4,820,589 | 4/1989 | Dobreski et al. | 428/422 |
| 4,833,024 | 5/1989 | Mueller | 428/349 |
| 4,835,218 | 5/1989 | Yoshimura et al. | 525/98 |
| 4,840,823 | 6/1989 | Chigami et al. | 428/35 |
| 4,863,769 | 9/1989 | Lustig et al. | 428/349 |
| 4,879,177 | 11/1989 | Boice | 428/339 |
| 4,897,274 | 1/1990 | Candida et al. | 426/127 |
| 4,923,722 | 5/1990 | Kondo | 428/349 |
| 4,923,750 | 5/1990 | Jones | 428/349 |
| 4,981,231 | 1/1991 | Knight | 525/222 |
| 5,001,016 | 3/1991 | Kondo et al. | 428/516 |
| 5,011,719 | 4/1991 | Gehrke et al. | 428/516 |
| 5,071,686 | 12/1991 | Genske et al. | 428/516 |
| 5,151,317 | 9/1992 | Bothe et al. | 428/516 |
| 5,188,882 | 2/1993 | Uchiyama et al. | 428/516 |
| 5,206,075 | 4/1993 | Hodgson | 428/516 |
| 5,208,094 | 5/1993 | Sun | 428/516 |

BLENDS OF POLYPROPYLENE AND ETHYLENE COPOLYMER AND FILMS MADE FROM THE BLEND

This is a divisional application of application Ser. No. 810,003, filed on Dec. 18, 1991, pending, which is turn is a continuation of application Ser. No. 659,215, filed Feb. 22, 1991, now abandoned, which in turn is a continuation-in-part of application Ser. No. 566,594, filed Aug. 13, 1990, now abandoned.

BACKGROUND OF THE INVENTION

The present invention pertains to compositions for making packaging film, and more particularly to a thin polymeric film suitable for replacing polyvinyl chloride film especially in packaging applications.

Polyvinyl chloride (PVC) has long been used in many applications in the packaging art. One particularly widespread application for PVC is the use of such material as an overwrap material for trayed retail cuts of meat and other food products in a retail environment such as a supermarket.

(PVC) has several desirable properties for this use. For example, it has excellent burn-through resistance, optics and good elasticity and stretch properties at use temperatures.

Unfortunately, PVC also has several disadvantages, including the production of hydrogen chloride gas during heat sealing and the generally corrosive effects of such gases in the packaging room. Extractables from the PVC into the packaged food product have also become of concern.

It would be of great benefit to the packaging industry, and particular to applications requiring an instore film for overwrapping trayed food products, to provide a film with many of the advantages of PVC but without the disadvantages described above.

The inventors have discovered that a blend of propylene polymer or copolymer, and ethylene copolymer, is useful in improving the burn-through resistance of a film made from the blend.

The inventors have also discovered that a relatively thin polymeric film, including a layer of the blend combined with an outer heat sealable layer, can be made using the inventive blend.

Processes for producing oriented films, and oriented films themselves are disclosed in many patents including the following patents of interest.

U.S. Pat. No. 3,456,044 (Pahlke) mentions thin films of thicknesses less than 1 mil such as 0.5 mils, and discloses a double bubble method for biaxially orienting thermoplastic films including the steps of producing a primary tubing which is inflated by introducing air into the interior thereof, and a cooling ring 22, as well as squeeze rolls 34 and 28, with rolls 34 having a greater speed than rolls 28. Between the two pairs of squeeze rolls is a reinflated secondary bubble. If annealing is desired, the tubing can be reinflated to form a bubble 70.

U.S. Pat. No. 3,555,604 (Pahlke) is a patent based on a divisional application which was derived from the same priority application as the '044 patent described above, and discloses the same information described above for the '044 patent.

U.S. Patent No. 4,258,166 (Canterino et al) discloses a uniaxially oriented plastic film material with improved strength and clarity in the direction of orientation preferably comprising homopolymers and copolymers of ethylene.

U.S. Pat. No. 4,355,076 (Gash) discloses monoaxially oriented polypropylene film laminated to a monoaxially oriented high density polyethylene film, the films produced by for example tubular blowing.

U.S. Pat. No. 4,440,824 (Bonis) discloses a thermoformable coextruded multilayer structure useful for thermoforming into containers, the structure having polyolefin coextruded with a high impact polystyrene layer. A five layer structure is shown.

U.S. Pat. No. 4,464,439 (Castelein) discloses a coextruded laminate having a sheet of polypropylene and a sheet of a mixture of high impact polystyrene, crystalline polypropylene, and styrene/dienic monomer block copolymer.

U.S. Pat. No. 4,879,177 (Boice) discloses a monoaxially oriented shrink film having a core layer of butadiene styrene copolymer, outer layers of ethylene propylene copolymer, and intermediate bonding layers of ethylene copolymer.

It is an object of the present invention to provide a composition which can be included in a thermoplastic film useful as an overwrap material for trayed retail cuts of meat and other food products in a super market or other retail environment.

It is also an object of the present invention to provide a composition of matter which has good burn-through resistance when included in a film.

It is also an object of the present invention to provide a film having excellent optical properties, specifically excellent gloss and clarity.

SUMMARY OF THE INVENTION

The invention is a composition of matter comprising a blend of propylene homopolymer or copolymer, and ethylene copolymer.

In another aspect of the present invention, a multilayer film comprises a first layer comprising a blend of propylene homopolymer or copolymer, and ethylene copolymer; and an outer sealable layer.

In another aspect of the present invention, a method of making an oriented polymeric film comprises coextruding a first melt stream of a blend of propylene polymer or copolymer, and ethylene copolymer, and a second melt stream of a sealable polymeric material; extruding the melt streams through a tubular die; hot blowing the extruded film; heating the hot blown film to a temperature above its orientation temperature; directing the heated film through a first set of pinch rolls; reinflating the hot blown film by a blown bubble process wherein the bubble is expanded in both its longitudinal and transverse directions; and collapsing the reinflated film through a second set of pinch rolls.

Definitions

The term "polyolefin" is used herein in its stricter sense to mean a thermoplastic polymer derived from simple olefins. Among these are polyethylene, polypropylene and copolymers thereof with olefinic comonomers. For example, very low density polyethylene may be considered a linear ethylene copolymer with a comonomer comprising such materials as butene, hexene or octene. The term "polyolefin" is also used herein in a broader sense to include copolymers of ethylene with comonomers that are not themselves olefins, such as vinyl acetate (e.g. ethylene vinyl acetate copolymer or EVA).

The term "very low density polyethylene", or "VLDPE" is used herein to describe linear ethylene alpha-olefin copolymer (flexomer) having densities of generally between about 0.860 and 0.915 grams/cubic centimeter, and produced by a catalytic, low pressure process. "Ultra low density polyethylene" is also included in this term.

The term "ethylene vinyl acetate copolymer" (EVA) as used herein refers to a copolymer formed of ethylene and vinyl acetate monomers wherein the ethylene derived units are present in major amounts and the vinyl acetate derived units are present in minor amounts, preferably one (1) to thirty (30) percent by weight.

The term "styrene butadiene copolymer" (SBC) is used herein to denote thermoplastic copolymers, especially block copolymers containing a major portion (greater than 50%) of styrene and a minor proportion (less than 50%) of butadiene comonomer.

The terms "melt flow" and "melt index" are used herein to mean the amount, in grams, of a thermoplastic resin which is forced through an orifice of specified length and diameter in ten minutes under prescribed conditions in accordance with ASTM D 1238.

The term "flow rate ratio" (FRR) is used to mean a dimensionless number derived by dividing the flow rate (melt flow or melt index) at one Condition with the flow rate at another Condition (ASTM D 1238). FRR is indicative of molecular weight distribution. The higher the FRR, the broader the molecular weight distribution.

The term "ethylene copolymer" is used herein in its strict sense to mean copolymers of ethylene and a comonomer, and in its broad sense to include materials such as polybutene which can be substituted for this first group of materials.

The term "ethylene alpha olefin copolymer" is used herein to refer to copolymers of ethylene and higher alpha olefins such as butene, 1-methyl pentene, hexene, and octene.

BRIEF DESCRIPTION OF THE DRAWINGS

The invention may be further understood by reference to the drawings herein, where.

DESCRIPTION OF THE PREFERRED EMBODIMENTS

A preferred composition is a blend of between about 20% and 80% propylene homopolymer or copolymer, and between about 80% and 20% very low density polyethylene. A more preferred composition is a blend of about 40% propylene homopolymer or copolymer, and about 60% very low density polyethylene. An even more preferred composition is a blend of about 60% propylene homopolymer or copolymer, and about 40% very low density polyethylene.

An especially preferred propylene resin is propylene ethylene copolymer such as that available from Fina under the designation Fina 8473 and Fina 8473x. These resins have an ethylene content of about 3% by weight.

Another especially preferred propylene resin is propylene homopolymer such as that available from Shell under the designation WRD5-981, with a melt flow rate of 0.6 to 0.8 grams/10 minutes (ASTM D 1238, Condition 230/2.16).

An especially preferred VLDPE is a high molecular weight resin such as DEFD 1015 from Union Carbide. This resin has a density of about 0.900 grams/cc, a melt flow rate of about 6 grams/10 minutes (ASTM D 1238, Condition 190/21.601), and a FFR ($I_{21}/I_{2.1}$) of about 50.

The preferred film structure is a multilayer composite having a core layer 10 comprising a blend of propylene polymer or copolymer, and very low density polyethylene (VLDPE).

Preferred VLDPE resins are characterized by high molecular weight (i.e. relatively low melt index), broad molecular weight distribution (i.e. relatively high flow rate ratio), and relatively low crystallinity at processing temperatures.

For the VLDPE, a melt index (MI) of no more than about 0.15 grams/10 minutes (ASTM D 1238) (Condition 190/2.16) is preferred. A more preferred MI is 0.12 grams/10 minutes.

Preferred VLDPE resins can also be characterized by a melt index of no more than about 0.50 grams/10 minutes, more preferably no more than about 0.45 grams/10 minutes (ASTM D 1238) (Condition 190/5.0); no more than about 1.50 grams/10 minutes, and more preferably no more than about 1.35 grams/10 minutes (ASTM D 1238) (Condition 190/10.); or no more than about 10 grams/10 minutes, and more preferably no more than about 6 grams/10 minutes (ASTM D 1238) (Condition 190/21.601).

For the VLDPE, a molecular weight distribution (flow rate ratio) of at least about 10 ($I_{21}/I_5$) (ASTM D 1238) is preferred. This value is derived by dividing the flow rate at Condition 190/21.6 by the flow rate at Condition 190/5.0. A more preferred FRR is 13.

Preferred VLDPE resins can also be characterized by a FFR of at least about 40, more preferably at least about 50 ($I_{21}/I_{2.1}$) (ASTM D 1238). This value is derived by dividing the flow rate at Condition 190/21.6 by the flow rate at Condition 190/2.16.

This preferred composition can be used in monolayer or multilayer film constructions.

Figure 1:
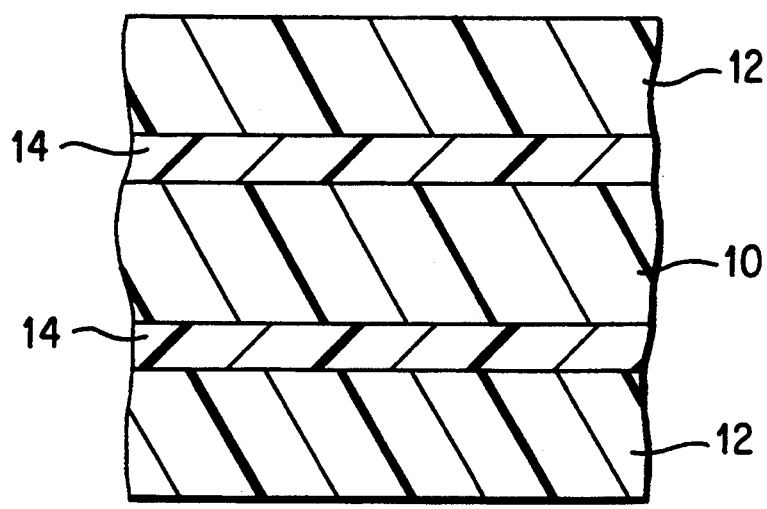
FIG. 1 is a schematic cross section of a preferred embodiment of a multilayer film in accordance with the invention.

Referring to FIG. 1, in one preferred film construction, outer layers 12 preferably comprise a polyolefin, more preferably an ethylene polymer or copolymer such as EVA. Styrenic polymers and copolymers, e.g. styrene butadiene copolymer such as that commercially available from Phillips under the designation KR-10 having a butadiene content of 25% by weight of the copolymer; or KK 36 (for fatty food contact) are also preferred.

In this embodiment of the invention, the outer layers 12 are bonded to the core layer 10 by means of intermediate layers 14 each comprising a polymeric adhesive and preferably a copolymer of ethylene, and more preferably an ethylene vinyl acetate copolymer (EVA). A more preferred EVA is one having a vinyl acetate content above about 18% by weight of the copolymer, and even more preferably about 28% by weight of the copolymer. Other polymeric materials, including chemically modified adhesives, can be used for layers 14 provided they process adequately in processes such as those disclosed herein. Blends of polymeric materials and polymeric adhesives can also be used for intermediate layers 14.

For outer layers 12, SBC resins having minor amounts of butadiene, ranging from about 1 to 50%, provide an optimum balance of stiffness and flexibility to the film.

For layers of the present invention which contain SBC, antifog/plasticizing agents such as Atmer 645 and/or Atmer 1010 are preferably included, more preferably in amounts of between about 0.5% and 10% by weight of the layer or layers. Even more preferably, between about 2% and 6% of such agents are included. The intermediate layers 14, and comparable layers in other films of the present invention, preferably also include such agents, more preferably in the 0.5% to 10% range.

The films of the present invention are preferably made by coextrusion techniques, combined with an apparatus and process depicted in FIG. 3 and described in more detail below.

An alternative preferred composition is a blend of between about 20% and 80% propylene homopolymer or copolymer, and between about 80% and 20% ethylene vinyl acetate copolymer. A more preferred composition is a blend of about 70% propylene homopolymer or copolymer, and about 30% ethylene vinyl acetate copolymer. Another preferred composition is a blend of about 50% propylene homopolymer or copolymer, and about 50% ethylene vinyl acetate copolymer.

Preferred propylene polymers or copolymers for the alternative embodiment are the same as those described above.

Preferred ethylene vinyl acetate copolymer resins for the alternative embodiment are those of the type listed and described in Table 1.

Figure 2:
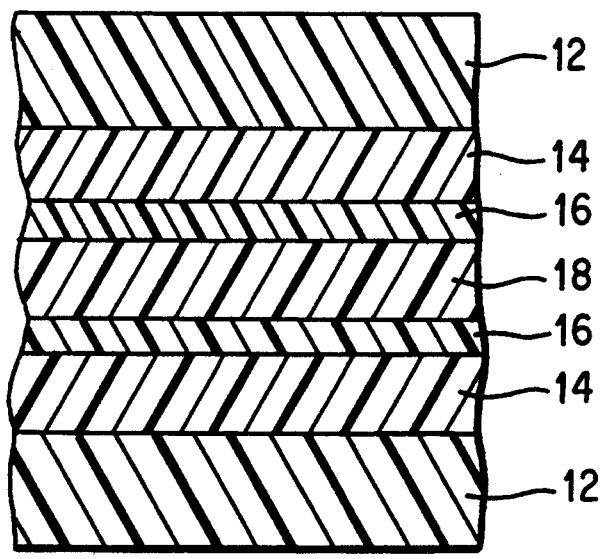
FIG. 2 is a schematic diagram indicating the apparatus and process by which the films of the present invention are made.

This alternative composition can also be used in monolayer and multilayer film constructions. FIG. 2 shows a preferred film construction made with the alternative blend composition.

The outer layers 12 and intermediate layers 14 each comprise the materials described for the film of FIG. 1.

The interior layers 16 comprise the polypropylene/EVA blend just described.

The core layer 18 comprises very low density polyethylene, and preferably high molecular weight, broad molecular weight distribution materials such as those described herein.

Still another embodiment includes a five-layer film like that described for FIG. 2, but without intermediate layers 14.

Figure 3:
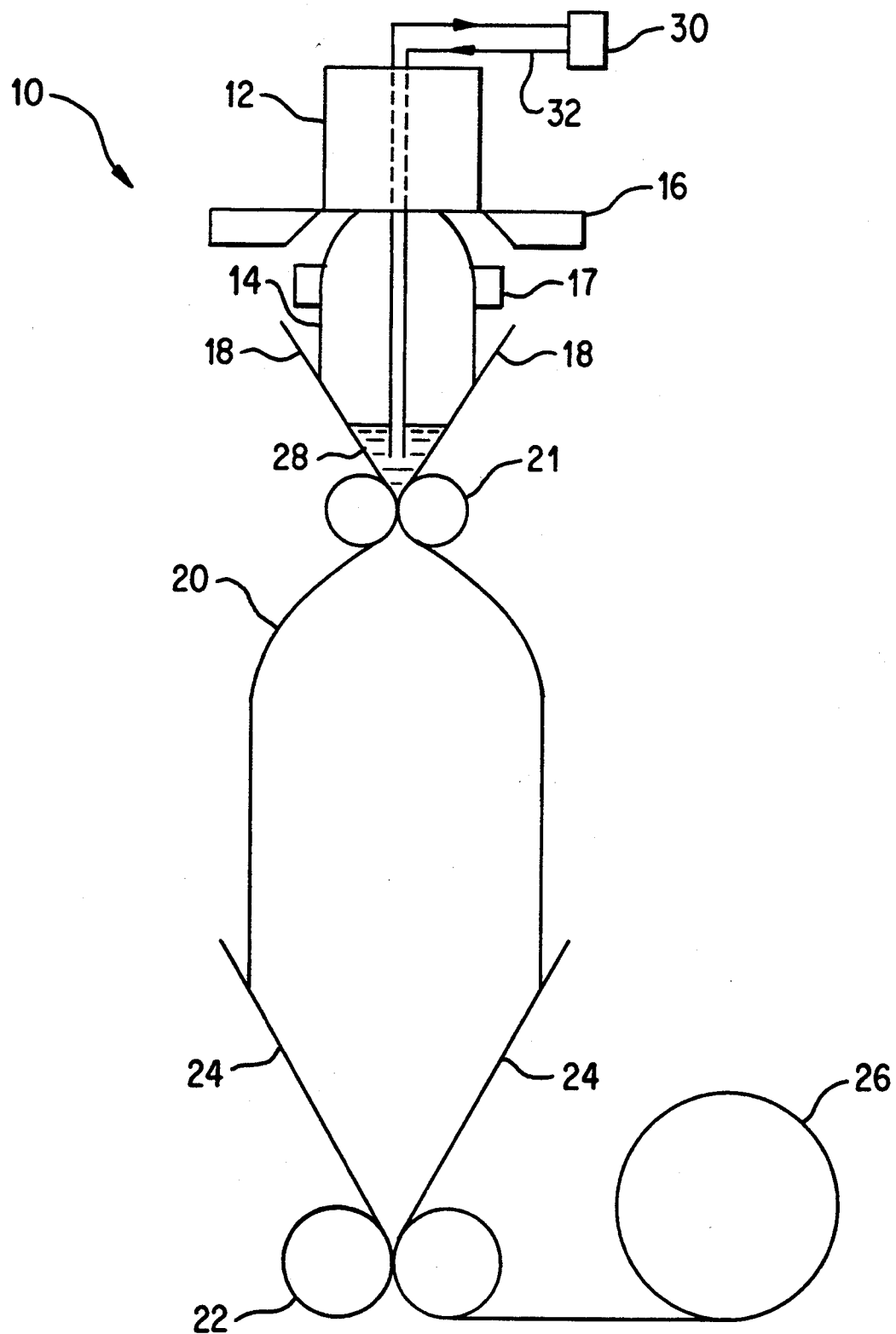
FIG. 3 is a schematic cross section of an alternative preferred embodiment of a multilayer film in accordance with the invention.

FIG. 3 shows schematically a device for making the films of the present invention.

A single melt stream, or multiple melt streams including a first melt stream of a blend of propylene polymer or copolymer, and ethylene copolymer, are extruded or coextruded and exit as an extrudate through an annular die 12 in a conventional manner. The extruded film is hot blown to form a blown bubble 14.

Air cooling ring 16 positioned circumferentially around the blown bubble at the position shown cools the thermoplastic melt as it exits die An optional auxiliary chilling ring or rings 17 may also be positioned circumferentially around the blown bubble down stream from air cooling ring 16 to further chill the hot blown film.

The primary bubble 14 is melt oriented in both the machine and transverse directions. Various blow up ratios may be used, but preferably the primary bubble 14 is hot blown to a blow up ratio of between 1.5 and 8.0.

The primary bubble 14 is collapsed at pinch rolls 21.

To assist in this process, guide plates 18 are positioned at the extremities of the blown bubble 14.

The preferred process for carrying out the present invention permits the bubble to be immediately reinflated, after cooling, into the secondary bubble 20 and then expanded to impart orientation of the material in primarily the transverse direction, primarily the longitudinal direction, or in both the transverse and longitudinal directions. This "flexibility" in the preferred process permits films of the invention to be produced which are oriented primarily in one direction (monoaxially oriented films) or films which are oriented in both the longitudinal and transverse directions (biaxially oriented films).

The collapsed bubble is reinflated in a blown bubble process to stretch orient the blown and collapsed film. This is done in a conventional manner by trapping air or other hot gas within the secondary bubble 20 so that the material stretches at its orientation temperature transversely to impart further orientation of the material in the transverse direction. The secondary bubble 20 is collapsed at a second set of pinch rolls 22. A second set of guide plates 24 may be employed to assist in the collapsing process.

The second set of pinch rolls 22 is rotated at a speed faster than the first set of pinch rolls 21 if it is desired to impart stretch orientation in the machine or longitudinal direction to the thermoplastic material.

The recollapsed bubble 20 then passes from the second set of pinch rolls 22 to take up roll 26.

The take up roll 26 may be a mill log which can be immediately stored or shipped to a distributor or customer, or may be stored for further processing such as slitting into single wound film, machine or natural center fold film. Thus, as used herein the take up roll 26 represents any further processing, storage, or further modification of the double wound, collapsed film once it exits the second set of pinch rolls 22, and is used herein to denote any of these possible further processing steps.

It is preferred that a reservoir 28 of heated fluid be disposed at the lower end of primary bubble 14 in such a way that the collapsing material drawn through the primary set of pinch rolls 21 will pass in communication with the heated fluid. In this manner, the film is more uniformly heated and temperature control can be achieved. Thickened tape edges can be substantially avoided by such means.

Although the heated fluid of reservoir 28 is preferably hot water, other media may be used if temperatures above the 212° F. limit of hot water are desired. For example propylene glycol (a food approved material), hot oil or hot emulsions may be used. One skilled in the art will understand that the exact nature of the heated fluid is not as critical as its effectiveness in helping to uniformly heat the collapsing bubble 14 as it is drawn through pinch rolls 21, and to uniformly heat the collapsing bubble 14 to a temperature above its orientation temperature.

The heated fluid may also be an "active" substance which not only reheats the surrounding film, but also actually coats the interior of the bubble as it passes over the reservoir. An example is a hot wax or other functional coating.

The heated fluid may be recirculated from the reservoir through a heating means 30 by means of conduits 32 or other suitable transfer means. Using the reservoir 28 of heated fluid, the types of materials which may be effectively used in the present process and device are increased.

Many different film constructions can be made using this process, including monolayer and multilayer films, especially those using the inventive blend compositions.

Biaxially oriented films of the present invention are useful in overwrap applications for overwrapping retail cuts of meat and non-food products.

Monoaxially oriented films are useful in shrink label applications for producing labels for vessels such as bottles and cans.

The term "monoaxially oriented" is used herein to mean films oriented primarily in the longitudinal direction. However, some incidental orientation can be present in the transverse direction, and this is sometimes desirable to help the film to grip a container or vessel after heat shrinking and to reduce the incidence of wrinkles in the final label. The term can also be used to refer to films oriented primarily in the transverse direction, with or without some incidental orientation in the longitudinal direction.

The invention may be further understood by reference to the examples which follow.

The examples below list preferred commercially available resins.

The resins used in these examples, and others useful in the invention, are identified in Table 1.

TABLE 1

| RESIN | COMMERCIAL NAME | DESCRIPTION | COMPANY |
| --- | --- | --- | --- |
| $SBC_1$ | KR-10 | STYRENE BUTADIENE COPOLYMER | PHILLIPS |
| $SBC_2$ | KK-36 | STYRENE BUTADIENE COPOLYMER WITH FATTY FOOD COMPLIANCE | Phillips |
| $EVA_1$ | ELVAX 3182 | EVA (28% VA) | DU PONT |
| $EVA_2$ | ELVAX 3165 | EVA (18% VA) | DU PONT |
| $EVA_3$ | 3170 | EVA (18% VA) | DU PONT |
| $VLDPE_1$ | XU 61509.32 | VERY LOW DENSITY POLYETHYLENE DENSITY = .911 grams/cc | DOW |
| $VLDPE_2$ | DEFD 1161 | VERY LOW DENSITY POLYETHYLENE | UNION CARBIDE |
| $VLDPE_3$ | TAFMER 0680 | VERY LOW DENSITY POLUETHYLENE DENSITY = .88 grams/cc | MITSUI |
| $VLDPE_4$ | 1015 | VERY LOW DENSITY POLYETHYLENE DENSITY = .900 grams/cc | UNION CARBIDE |
| $PP_1$ | 8473 | EPC | FINA |
| $PP_2$ | WRD5-981 | POLYPROPYLENE | SHELL |
| $PL_1$ | 22-164 | 50% POLYISOBUTYLENE IN LLDPE | SANTECH |

TABLE 2

| Composition | Orientation Temperature | Results |
| --- | --- | --- |
| 100% $VLDPE_4$ | 210° F. | clear film |
| 80% $VLDPE_4$ + 20% $PP_1$ | 212° F. | clear film |
| 60% $VLDPE_4$ + 40% $PP_1$ | 225° F. | clear film |
| 40% $VLDPE_4$ + 60% $PP_1$ | 225° F. | clear film |
| 20% $VLDPE_4$ + 80% $PP_1$ | 225° F. | couldn't orient due to improper mixing (gels) |

Example 2

Double wound film (4 mils thick) of both 100% $VLDPE_4$, and the blend of 80% $VLDPE_4$ and 20% $PP_1$ were oriented on a hat tester (parallel orientation) at 210° F. A hat tester is a device for blow-orienting laboratory film samples. A film sample, having a size of about 4 inches by 4 inches, is clamped over an orifice situated in a horizontal table. An overhead radiant heater heats the film to a predetermined orientation temperature. Then, air is blown upwardly through the orifice to create an oriented hemispherical shape ("hat") in the film. In each case, the resulting hat was ply separated after orientation into two hats of oriented film.

Example 1

$VLDPE_4$ alone, and pellet blends with $PP_1$ were extruded at 500° F. barrel temperature on a ¾ inch extruder (Brabender) and blown into 2 mil thick film from a 1 inch annular die set at 450° F. with a blow-up ratio of 2.8:1.

The 2 mil films were then oriented into film using a hat tester on the following day. The results are shown below in Table 2.

Example 3

Multiple oriented hat samples for each of the compositions of Table 1 were made by the procedure described in Example 2. These hats were about 0.20 mils thick. A styrofoam disc with a diameter of 2.6 inches, and a 500 gram weight, were inserted into the cavity of each hat.

These hats were evaluated on a hot pad sealer to determine their burn-out threshold. The multiple hat samples for each composition, with the disc and weight therein, were each placed in turn on a hot pad preheated to different predetermined temperatures and left there for about 10 seconds. Each hat sample was evaluated for degree of burn-out. The aggregate results for each composition, are shown in Table 3.

TABLE 3

| Composition (% $PP_1$) | Burn-out Threshold Temperatures |
|---|---|
| 0 | 230 to 240° F. |
| 20 | 250 to 260° F. |
| 40 | 280 to 290° F. |
| 60 | 290 to 300° F. |

Example 4

A film having the construction $SBC_1/EVA_1/80\%$ $VLDPE_4+20\%$ $PP_1/EVA_1/SBC_1$ is produced by the process described above for FIG. 3. Tubular film is hot blown, collapsed through a pair of pinch rolls and reinflated into a secondary bubble. The secondary bubble is stretched in the machine direction and in the transverse direction to produce a thin film.

The outer layers of $SBC_1$ each form about 15% of the final film gauge. The core layer of the blend of 80% $VLDPE_1$ and 20% $PP_1$ forms about 40% of the final film gauge by thickness. The intermediate adhesive layers of $EVA_1$ each comprise about 15% of the final film gauge.

Example 5

A film like that of Example 4 is made, by the same process, but having 20% $VLDPE_4+80\%$ $PP_1$ in the blend layer.

Example 6

A film having the construction $SBC_1/EVA_2/VLDPE_4/30\%$ $EVA_2+70\%PP_1/VLDPE_4/EVA_2/SBC_1$ was produced by the process described above for FIG. 3.

Example 7

A film having the construction $SBC_1/EVA_2/VLDPE_4/50\%$ $EVA_2+50\%$ $PP_1/VLDPE_4/EVA_2/SBC_1$ was produced by the process described above for FIG. 3.

Example 8

A film having the construction $SBC_1/EVA_2/VLDPE_4/70\%$ $VLDPE_4/70\%$ $EVA_2+30\%$ $PP_1/VLDPE_4/EVA_2/SBC_1$ is produced by the process described above for FIG. 3.

Additional films were produced by the process described above for FIG. 3. These films are identified in Table 4 as Examples 9-18. In Example 12, the film contained 5% polypropylene by weight of the total film structure. In Example 13, polypropylene formed about 10% of the total film structure by weight. In Example 15, the core layer of the blend of EVA and polypropylene formed about 15% by weight of the total film structure. In Example 16, the core layer blend constituted about 20% of the total film structure. In Example 18, the same film structure was produced as in Example 17, but with a higher level of antifog agent. The films of Example 9-18 were oriented in the secondary bubble at a ratio of about 2.0:1 in each of the transverse and longitudinal directions.

TABLE 4

| EXAMPLE | FILM STRUCTURE |
|---|---|
| 9 | $SBC_1/EVA_2/80\%$ $VLDPE_4/EVA_2/SBC_1 + 20\%$ $PP_2$ |
| 10 | $SBC_1/EVA_2/90\%$ $VLDPE_4/EVA_2/SBC_1 + 10\%$ $PP_2$ |
| 11 | $SBC_1/EVA_2/70\%$ $VLDPE_4/EVA_2/SBC_1 + 30\%$ $PP_2$ |
| 12 | $SBC_1/EVA_2/VLDPE_4/PP_2/VLDPE_4/EVA_2/SBC_1$ |
| 13 | $SBC_1/EVA_2/VLDPE_4/PP_2/VLDPE_4/EVA_2/SBC_1$ |
| 14 | $SBC_1/EVA_2/VLDPE_4/50\%$ $EVA_2/VLDPE_4/EVA_2/SBC_1 + 50\%$ $PP_2$ |
| 15 | $SBC_1/EVA_2/VLDPE_4/30\%$ $EVA_2/VLDPE_4/EVA_2/SBC_1 + 70\%$ $PP_2$ |
| 16 | $EVA_2/VLDPE_4/50\%$ $EVA_2/VLDPE_4/EVA_2/SBC_1 + 50\%$ $PP_2$ |
| 17 | $SBC_1/EVA_2/VLDPE_4/50\%$ $EVA_2/VLDPE_4/EVA_2/SBC_1 + 50\%$ $PP_2$ |
| 18 | $SBC_2/EVA_2/VLDPE_4/50\%$ $EVA_2/VLDPE_4/EVA_2/SBC_2 + 50\%$ $PP_2$ |

Additional films were made by standard blown film techniques, using about a 5:1 blow up ratio. These films are listed in Table 5 as Examples 19-27. The temperatures at which the films burned out in testing of the burn through resistance of the film are indicated in the right hand column of the table.

Another example of the present invention is a film including the construction:

SBC/ADH+PP/VLDPE/ADH+PP/SBC where ADH is a polymeric adhesive such as $EVA_1$, $EVA_2$, or $EVA_3$, or any suitable adhesives such as the carboxylic acid or acid anhydride-modified polymeric adhesives known in the art; and where PP is $PP_1$, $PP_2$, or other suitable propylene polymers or copolymers. ADH and PP may be blended in any of the proportions disclosed herein for PP blend layers.

TABLE 5

| EXAMPLE | FILM STRUCTURE |
|---|---|
| 19 | $EVA_2/VLDPE_4/EVA_2$ |
| 20 | $EVA_2/VLDPE_4/90\%$ $VLDPE_4/VLDPE_4/EVA_2 + 10\%$ $PP_2$ |
| 21 | $EVA_2/VLDPE_4/75\%$ $VLDPE_4/VLDPE_4/EVA_2 + 25\%$ $PP_2$ |
| 22 | $EVA_2/VLDPE_4/50\%$ $VLDPE_4/VLDPE_4/EVA_2 + 50\%$ $PP_2$ |
| 23 | $EVA_2/VLDPE_4/25\%$ $VLDPE_4/VLDPE_4/EVA_2 + 75\%$ $PP_2$ |
| 24 | $EVA_2/VLDPE_4/PP_1/VLDPE_4/EVA_2$ |
| 25 | $SBC_1/EVA_2/80\%$ $VLDPE_4/EVA_2/SBC_1 + 10\%$ $PP_2 + 10\%$ $PP_1$ |
| 26 | $SBC_1/EVA_2/VLDPE_4/50\%$ $VLDPE_4/VLDPE_4/EVA_2/SBC_1 + 50\%$ $PP_2$ |
| 27 | 75% $SBC_1/EVA_2/VLDPE_4/50\%$ $VLDPE_4/VLDPE_4/EVA_2/75\%$ $SBC_1 + 25\%$ $VLDPE_3/+ 50\%$ $PP_2/+25\%$ $VLDPE_3$ |

Films of the present invention can optionally be cross-linked. This can be done chemically or by the use of irradiation.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

While the invention has been disclosed with reference to illustrative examples, those skilled in the art will understand that various modifications may be made to the invention as disclosed without departing from the sphere and scope of the claims which follow.

For example, in an alternative embodiment, a single layer of a blend of propylene polymer or copolymer, and ethylene copolymer (preferably VLDPE or EVA) can be adhered, either directly, by means of a polymeric adhesive layer, or by conventional lamination adhesives to a single layer of a sealable polymeric material by one of the methods disclosed herein, to produce a film with a preferred thickness of less than about 1 mil. Thus, both asymmetric and symmetric two, three, four, five, six, and seven layer structures can be made from the composition of the present invention. Additional layers can be added to these structures to meet specific end Use requirements, such as toughness, barrier properties and the like.

Also, polybutene and ethylene butene copolymer can be used as an alternative ethylene copolymer in the inventive blend.

What is claimed is:

1. A multilayer film comprising the following layers, each of a), b), and c) having a different polymer composition:
   a) a core layer comprising propylene polymer or copolymer, and very low density polyethylene;
   b) two outer layers each comprising a styrene diene copolymer; and
   c) two intermediate layers each bonding the core layer to a respective outer layer, and comprising a polymeric adhesive.

2. The film of claim 1 wherein the very low density polyethylene has a melt index before blending of less than about 10 grams/10 minutes (ASTM D1238) (Condition 190/21.601).

3. The film of claim 1 wherein the very low density polyethylene has a flow rate ratio ($I_{21}/I_{2.1}$) before blending of at least about 40 (ASTM D 1238).

4. The film of claim 1 wherein the two outer layers each include between about 0.1% and 10% by weight of each outer layer, of a plasticizer.

5. The film of claim 1 wherein the two outer layers each have a thickness of less than about 0.04 mils.

6. The film of claim 1 wherein the two outer layers each comprise less than about 4% of the total film thickness.

7. The film of claim 1 wherein at least one layer of the film is cross-linked.

8. A multilayer film comprising the following layers, each of a), b), c) and d) having a different polymer composition:
   a) a core layer comprising very low density polyethylene;
   b) two interior layers, each layer bonded to an opposite side of the core layer, comprising a blend of propylene polymer or copolymer, and very low density polyethylene;
   c) two outer layers each comprising a styrene diene copolymer; and
   d) two polymeric adhesive layers each bonding an interior layer to respective outer layer.

9. The film of claim 8 wherein the very low density polyethylene in b) has a melt index before blending of less than about 10 grams/10 minutes (ASTM D 1238) (Condition 190/21.601).

10. The film of claim 8 wherein the very low density polyethylene in b) has a flow rate ratio ($I_{21}/I_{2.1}$) before blending of at least about 40 (ASTM D 1238).

11. The film of claim 8 wherein the two outer layers each include between about 0.1% and 10% by weight of each outer layer, of a plasticizer.

12. The film of claim 8 wherein the two outer layers each have a thickness of less than about 0.04 mils.

13. The film of claim 8 wherein the two outer layers each comprise less than about 4% of the total film thickness.

14. The film of claim 8 wherein the adhesive layers comprise an olefin polymer or olefin copolymer with adhesive properties.

15. The film of claim 14 wherein the adhesive layers comprise ethylene vinyl acetate copolymer.

16. The film of claim 8 wherein at least one layer of the film is cross-linked.

* * * * *